UNITED STATES PATENT OFFICE.

JEROME W. SIMPSON, OF NEWARK, NEW JERSEY.

PROCESS OF EXTRACTING GOLD, SILVER, AND COPPER FROM THEIR ORES.

SPECIFICATION forming part of Letters Patent No. 323,222, dated July 28, 1885.

Application filed October 20, 1884. (No specimens.)

*To all whom it may concern:*

Be it known that I, JEROME W. SIMPSON, a citizen of the United States, residing at Newark, in the county of Essex and State of New Jersey, have invented certain new and useful Improvements in Processes of Extracting Gold, Silver, and Copper from their Ores; and I do hereby declare the following to be a full, clear, and exact description of the invention, such as will enable others skilled in the art to which it appertains to make and use the same.

The object of this invention is to extract certain metals from their ores more effectually and at a reduced cost; and it consists in the processes hereinafter set forth, and finally embodied in the clauses of the claims.

To carry my invention into effect, I first grind or crush the ore containing the metal to be extracted to a powder of more or less fineness. This powder is then treated with certain salts in solution adapted to combine chemically with the metal in said ore and form therewith a soluble salt. After thorough agitation to mix the solution with the ore, the mixture is allowed to stand until the solid matter is settled and the solution has become clear. I then suspend a piece or plate of zinc therein, which causes the metal dissolved in the salt solution to be precipitated thereon, from which it can be removed by scraping or by dissolving the zinc in sulphuric or hydrochloric acid. The precipitated metal may then be melted into a button.

The salt solution I use for dissolving the metal from the ore is composed of one pound of cyanide of potassium, one ounce carbonate of ammonia, one-half ounce chloride of sodium, and sixteen quarts of water, or other quantities in about the same proportions.

This solution is particularly adapted for ores containing gold, silver, and copper in the form of sulphurets.

For an ore containing gold and copper only I use cyanide of potassium and carbonate of ammonia about in the proportions named.

For ores rich in silver I employ a proportionately larger quantity of chloride of sodium.

I am aware that cyanide of potassium, when used in connection with an electric current, has been used for dissolving metal, and also that zinc has been employed as a precipitant, and the use of these I do not wish to be understood as claiming, broadly.

I am also aware that carbonate of ammonia has been employed for dissolving such metals as are soluble in a solution thereof, and the use of this I do not claim; but

What I claim as new is—

1. The process of separating gold and silver from their ores which consists in subjecting the ore to the action of a solution of cyanide of potassium and carbonate of ammonia, and subsequently precipitating the dissolved metal, substantially as set forth.

2. The process of separating metals from their ores, to wit: subjecting the ore to the action of a solution of cyanide of potassium, carbonate of ammonia, and chloride of sodium, and subsequently precipitating the dissolved metals.

In testimony that I claim the foregoing I have hereunto set my hand this 15th day of October, 1884.

JEROME W. SIMPSON.

Witnesses:
 OLIVER DRAKE,
 CHARLES H. PELL.